US 7,574,425 B2

(12) United States Patent
Taylor et al.

(10) Patent No.: US 7,574,425 B2
(45) Date of Patent: Aug. 11, 2009

(54) SYSTEM AND METHOD FOR QUERY MANAGEMENT IN A DATABASE MANAGEMENT SYSTEM

(75) Inventors: Paul S. Taylor, Redwood City, CA (US); Robert Gerber, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/004,494

(22) Filed: Dec. 3, 2004

(65) Prior Publication Data

US 2006/0122975 A1    Jun. 8, 2006

(51) Int. Cl.
*G06F 7/00* (2006.01)
*G06F 17/30* (2006.01)

(52) U.S. Cl. .................. 707/3; 707/1; 707/2; 707/4; 707/5; 707/6

(58) Field of Classification Search .................. 707/1–6
See application file for complete search history.

(56) References Cited

U.S. PATENT DOCUMENTS

| | | | | |
|---|---|---|---|---|
| 5,692,193 | A * | 11/1997 | Jagannathan et al. | 718/106 |
| 5,864,862 | A * | 1/1999 | Kriens et al. | 707/103 R |
| 5,950,195 | A * | 9/1999 | Stockwell et al. | 707/4 |
| 6,085,198 | A * | 7/2000 | Skinner et al. | 707/103 R |
| 6,240,406 | B1 * | 5/2001 | Tannen | 707/2 |

(Continued)

FOREIGN PATENT DOCUMENTS

JP        9016532 A    * 10/1996

OTHER PUBLICATIONS

Hudson et al., "Effectiveness of Query Types and Policies for Preference Elicitation in Combinatorial Auctions", AAMAS '04: Proceedings of the Third International Joint Conference on Autonomous Agents and Multiagent Systems—vol. 1, Jul. 2004, pp. 368-393. download: http://delivery.acm.org/10.1145/1020000/1018771/p386.pdf?key1=1018771&key2=1.*

(Continued)

*Primary Examiner*—John E Breene
*Assistant Examiner*—Hares Jami
(74) *Attorney, Agent, or Firm*—Walter W. Duft; Steven L. Bennett (57) ABSTRACT

A system, method and computer program product for managing database query execution using control point policies that can (1) defined, (2) applied to a sphere of database operation, and (3) evaluated at run time to determine whether a policy action should be taken. A control point policy "definition" can include the specification of (1) an operational control point to which the control point policy is applied, (2) a control point policy filter that determines whether the control point policy will be implemented, and (3) a control point policy action to be implemented pursuant to the control point policy. The "application" of a control point policy can include the specification of (1) a scope of database management system operation, (2) a level representing the precedence of the control point policy relative to other control point policies, and (3) an operational environment for control point policy execution. The "evaluation" of a control point policy can include evaluating the filter specification of an applied control point policy when the associated control point is reached to determine whether the policy action should be taken.

19 Claims, 2 Drawing Sheets

U.S. PATENT DOCUMENTS

| | | | |
|---|---|---|---|
| 6,374,252 B1* | 4/2002 | Althoff et al. | 707/102 |
| 6,529,915 B1* | 3/2003 | Owens et al. | 707/103 R |
| 6,741,992 B1* | 5/2004 | McFadden | 707/10 |
| 7,240,068 B2* | 7/2007 | Hsu et al. | 707/102 |
| 7,281,003 B2* | 10/2007 | Lei et al. | 707/3 |
| 2003/0033277 A1* | 2/2003 | Bahulkar et al. | 707/1 |
| 2004/0117407 A1* | 6/2004 | Kumar et al. | 707/200 |
| 2004/0193606 A1* | 9/2004 | Arai et al. | 707/9 |
| 2005/0192921 A1* | 9/2005 | Chaudhuri et al. | 707/1 |

OTHER PUBLICATIONS

Becker et al., "Cassandra: distributed access control policies with tunable expressiveness", Policies for Distributed Systems and Networks, 2004. Policy 2004. Proceedings. Fifth IEEE International Workshop, Jun. 7-9, 2004, pp. 159-168. download: http://ieeexplore.ieee.org/search/searchresult.jsp?query1=policy&scope1=jn&op1=and&query2=query&.*

M. Skold et al., "Rule contexts in active databases—a mechanism for dynamic rule grouping," Rules in Database Systems. Second International Workshop, RIDS '95 Proceedings (Sep. 1995), Abstract of p. 119-30.

O. Diaz, "The operational semantics of user-defined relationships in object oriented database systems," Data & Knowledge Engineering, v16, n3 (Sep. 1995) Abstract of p. 223-40.

S. Jagannathan, "Dynamic modules in higher-order languages," Proceedings of 1994 IEEE International Conference on Computer Languages (ICCL '94) (May 1994), Abstract of p. 74-87.

C. M. Holt, "Alterable visual languages," Proceedings. 1997 IEEE Symposium on Visual Languages, (Sep. 1997), Abstract of p. 276-83.

O. De Moor et al., "Aspect-oriented compilers." Generative and component-based software engineering. First International Symposium, GCSE '99, (Sep. 1999) Abstract of p. 121-33.

* cited by examiner

SYSTEM AND METHOD FOR QUERY MANAGEMENT IN A DATABASE MANAGEMENT SYSTEM

BACKGROUND OF THE INVENTION

1. Field of the Invention

This invention relates to database management systems. More particularly, the invention is directed to the implementation of query management policies in a database management server.

2. Description of the Prior Art

By way of background, database management systems require controls that can be implemented to adapt the database management servers of such systems to changing workloads, query types, user activity, etc. For example, in a real-time data warehouse environment, it is relatively easy to overload a database management server with too many users, too much memory utilization, and poor caching effects due to the large amount of data being referenced. Current database management servers use a fixed policy management approach in which static environmental and control parameter settings are used to indirectly affect the critical execution paths and semantics of the database management server as database resources, workloads and users change. Such database management servers do not provide adequate control mechanisms that can dynamically adapt to the complex combinations of conditions that can arise during run time.

In the example above, as the number of users increases or achieves some threshold value, a database administrator might want to change the concurrency control optimizations to favor high concurrency. Similarly, if it is recognized that a particular user or a particular query is extremely important, the database administrator might want to assign a set of run-time parameter settings that optimizes the run-time for that particular user or that particular query. However, the specific user or the specific query is often not known in advance when the original application is developed.

It would be desirable to provide a technique whereby policy management in a database management system can be more flexibly implemented. What is particularly needed is a solution in which policy management is based on environmental and control parameters that can be dynamically defined, manipulated and applied relative to critical paths and decision points during transaction processing.

SUMMARY OF THE INVENTION

The foregoing problems are solved and an advance in the art is obtained by a novel system, method and computer program product for managing database query execution by way of flexible control point policies that can be (1) defined, (2) applied to a sphere of database operation, and (3) evaluated at run time to determine whether a policy action should be taken.

In exemplary embodiments of the invention, the "definition" of a control point policy includes the specification of (1) an operational control point to which the control point policy is applied, (2) a control point policy filter that determines whether the control point policy will be implemented, and (3) a control point policy action to be implemented pursuant to the control point policy.

The "application" of a control point policy in exemplary embodiments of the invention includes the specification of (1) a scope of database management system operation, (2) a level representing the precedence of the control point policy relative to other control point policies, and (3) an operational environment for control point policy execution.

The "evaluation" of a control point policy in exemplary embodiments of the invention includes evaluating the filter specification of an applied control point policy when the associated control point is reached to determine whether the policy action should be taken.

Further embodiments of the invention can include control point tracing for retaining a history of applied control point policy evaluations, and a control database for maintaining control point policies.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

The invention will now be described by way of exemplary embodiments shown by the drawing figures, in which like reference numerals indicate like elements in all of the several views.

Figure 1:
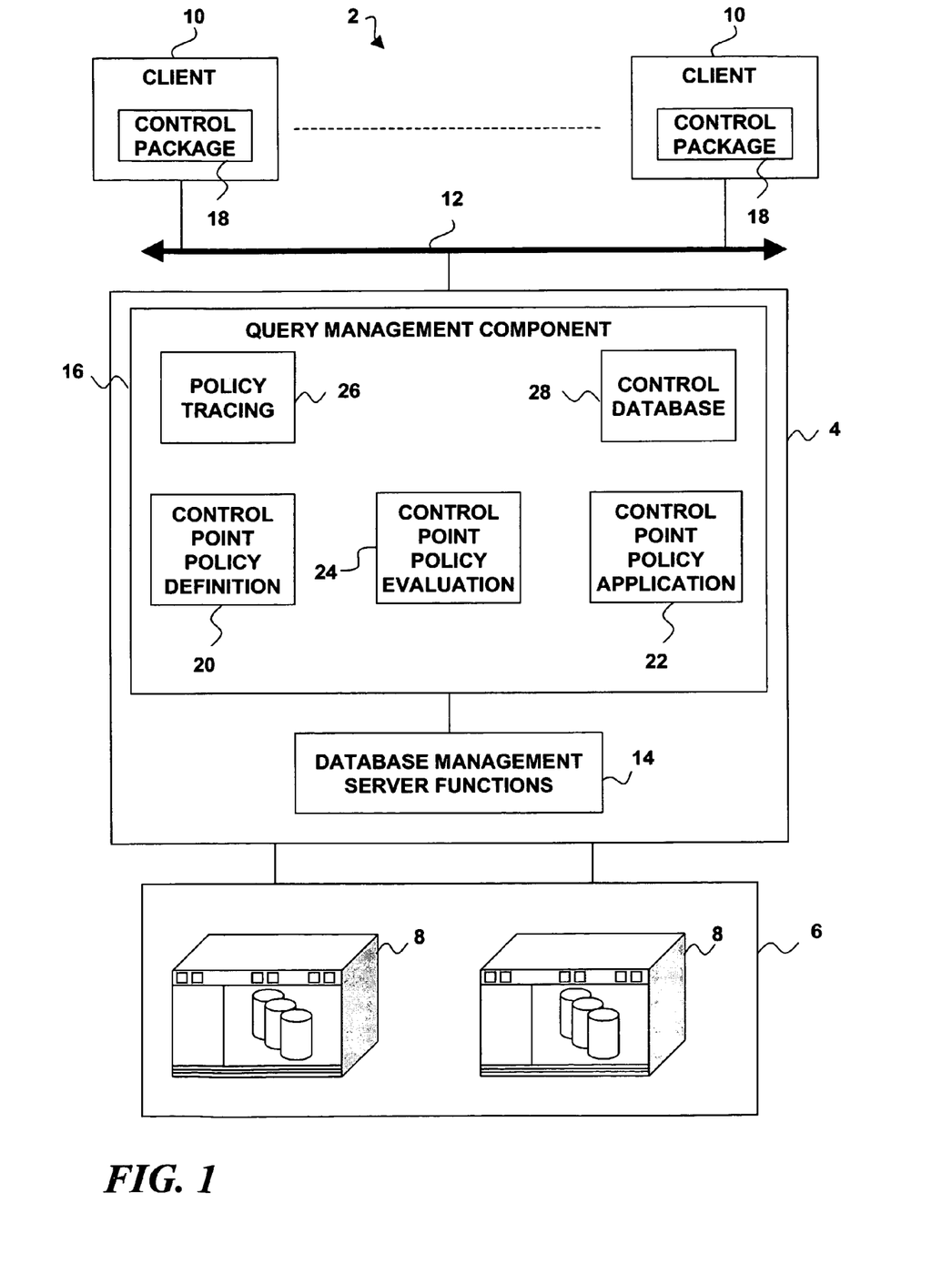
FIG. 1 is a functional block diagram showing an exemplary database management system in which the present invention can be implemented.
Figure 2:
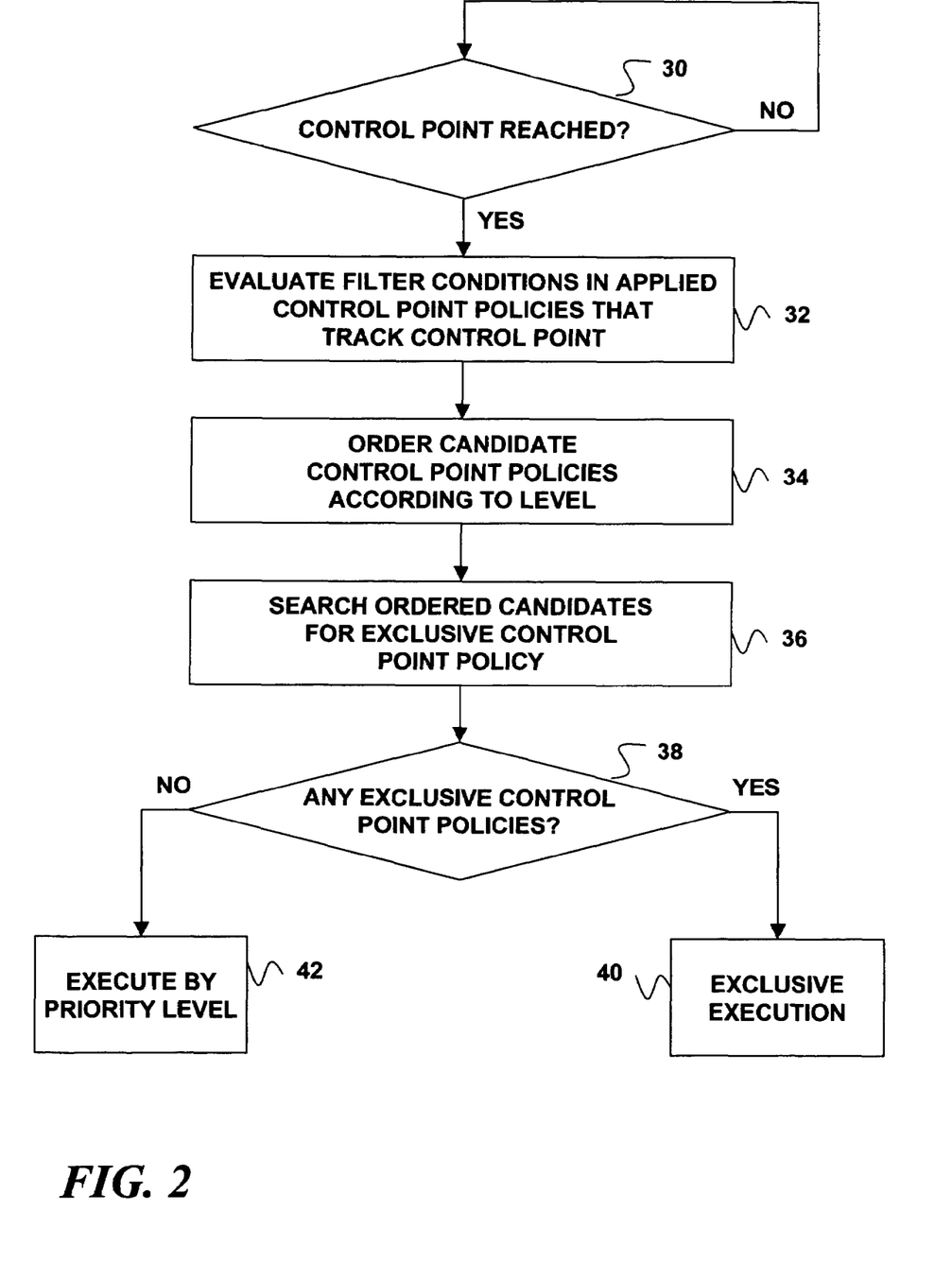
FIG. 2 is flow diagram showing exemplary processing steps for evaluating applied control point policies.

Turning to FIG. 1, a database management system 2 is shown that may be used to implement the invention according to one possible implementation thereof. The database management system 2 is configured with a database management server 4 that manages a database 6 whose data is resident on one or more data storage subsystems 8. One or more clients 10 communicate database query requests to the database management server 4 by way of a suitable communication interface, such as a LAN (Local Area Network) or WAN (Wide Area Network) 12. The database management server 4 services the client query requests by invoking appropriate database query functions, and returns the query results to the requesting client(s). Although only one database management server 4 is shown in FIG. 2, it is to be understood that multiple database management servers could be used in the alternative to provide a parallel server environment.

Except as otherwise indicated in the discussion to follow, the foregoing components of the database management system 2 are conventional in nature, and can be implemented using existing hardware and software resources of the kind that are well known in the database management art. The database management server 4 will be normally (but not always) programmed to accommodate multiple clients 10 who may connect simultaneously to the database management server 4 for the purpose of issuing potentially diverse types of database query requests. These requests could include routine online transaction processing (OLTP) requests in which relatively few database records need to be processed with sub-second response time. The clients 10 could also issue, on an ad hoc basis, processor-intensive decision support system (DSS) requests requiring hours to complete.

To support the foregoing types of queries, the programming in the database management server 4 will implement the usual set of database management server functions 14. These include, but are not necessarily limited to, various transaction management, scheduling and data management functions such as query optimization, scan processing, join processing, aggregation processing, sort processing, convergence processing, final result set processing, logging, recovery, index management, concurrency control, buffer pool management, and parallel query processing.

I. Introduction to Control Point Policy-Based Query Management

In accordance with the present invention, the database management server 4 additionally implements a query management component 16 that allows control and management parameters to be defined, manipulated and applied during execution of the database management server functions 14. Instead of trying to indirectly affect the critical execution paths and semantics of the server using prior art static control techniques, the query management component 16 allows critical execution paths and decision points to be opened up to direct and dynamic control.

The vehicle for this control capability is the control point policy. Control point policies implemented by the query management component 16 can be defined to respond to pre-defined operational conditions (or combinations of conditions) with pre-specified actions. Once defined, control point policies can also be modified, supplemented, or deleted so that increasingly sophisticated control policies can be applied to the database management server 4 without requiring a server upgrade.

The central role of the control point policies implemented by the query management component 16 is to manage query workload on the server 4. Control point policies further provide (1) the ability to specify global conditions and resources that should be monitored, (2) the ability for database users associated with the clients 10 to define events of interest within the database management server 4, and (3) the ability to define the semantics of overlapping environments of user and system execution.

Following is a brief description of specific control point policy-related functions implemented by the query management component 16 in accordance with the present. invention:

Control Point Policy Definitions

One of the functions of the query management component 16 is to allow users to define control point policies using external control packages 18 associated with the clients 10 (and with a database administrator system (not shown)). The external control packages 18 provide front-end interfaces that allow clients and administrators to interact with a control point policy definition unit 20 of the query management component 16.

Control point policy definitions represent specifications for the conditions and actions of the query management component 16. Each control point policy definition includes a specification of the operational point where the policy is targeted, a condition filter that can trigger the activation of the policy and a set of actions that are to be asserted. Note that until a control point definition has been applied (see below), the control point policy is considered to be inactive.

Control Point Policy Application

Another function of the query management component 16 is to allow users to apply control point policies by instantiating control point policy definitions. This functionality is illustrated by reference numeral 22 in FIG. 1. The definition of a control point policy is thus separated from the application of a control point policy. Once a control point policy has been applied, it is considered to be an active control point policy. This approach enables a given control point policy to be reused selectively in a variety of overlapping spheres of control within the database management system 2. The application of a control point policy allows the scope, level and environment of that policy to be explicitly controlled.

The term "scope" in the context of an applied control point policy refers to a sphere of database management system operation, such as a named database or a user. Additional spheres of operation to which a control point policy may be applied include two database management control entities known as "applications" and "roles." As is known in the database management art, an application refers to the ability of one or more users to communicate and control a database management server by explicitly defining distinct partitions of a complex workload such that the execution footprint can be more effectively controlled and multiplexed. Additionally, an application may correspond to a particular software entity that runs on a client 10 (or on an intermediate application server (not shown)) for the purpose of interacting with the database management server 4. A "role" is a user-defined collection of privileges that allows database control parameters, such as access permissions, to be managed on group basis rather than individually.

The term "level" in the context of an applied control point policy refers to the precedence that the control point policy has relative to other applied control point policies having overlapping scope. A level indicator allows overlapping control point policies to be evaluated and implemented in the correct order.

The term "environment" in the context of an applied control point policy refers to the run-time environment that will exist while the control point policy is active. An environment can be specified by a user, in which case it is a "user" environment, or by a database system administrator, in which case it is a "system" environment. The query management component 16 enables the relevant aspects of an environment, such as environment variables, to be encapsulated within a named object that can be applied, displayed, changed and so forth.

Control Point Evaluation

Another function of the query management component 16 is to evaluate an applied control point policy's filter definition when the policy's target control point is reached, and to execute the policy's action definition if the filter condition is present. This functionality is illustrated by reference numeral 24 in FIG. 1. At any given control point target, multiple candidate control point policies may need to be evaluated that include potentially overlapping sets of conditions and actions. Control point evaluation requires a consistent semantic for evaluating and applying such policies in proper order.

Control Point Policy Tracing

The capability of tracing the effects of control point policy evaluations can be provided for purposes of debugging and documenting the actions of the query management component 16. This functionality is shown by reference numeral 26 in FIG. 1.

Control Database

An explicit control database can be created for use by the query management component 16 to store its definitions and current state. This functionality is shown by reference numeral 28 in FIG. 1.

II. Control Point Policy Definition

As briefly described above, a control point policy is defined to operate on a specified control point such that, if conditions specified in a filter definition are present, one or more control point policy actions are taken. Following is an exemplary syntax that can be used to define control point policies, including a listing of exemplary parameters that may be selected. Following the exemplary syntax definition is a more detailed discussion of each exemplary parameter type. It will be appreciated that other syntax definitions may be alternatively used to implement the invention, depending on design preferences.

In the database management system of FIG. 1, the control package 18 in a client 10 can be invoked by a user to create a control point policy definition using the exemplary syntax to be described. The control package 18 would interact with the query management component 16, which in turn would create and store the control point policy definition in an appropriate storage location (not shown) using the functionality associated with reference numeral 20. In the exemplary syntax description below, terms containing all capital bold letters are command specifications, terms containing initial capital letters and preceded by "--" are parameter type identifiers, and terms within brackets "{ }" are individual exemplary parameters that could be used in a practical implementation of the invention. Again, it will be appreciated that the listed command specifications, parameter types and parameters are not intended to be exhaustive, and variants of each could be used in accordance with design preferences. Explanatory comments are identified using standard programming language notation.

A. Create Control Point (Syntax)

```
CREATE CONTROL -- Control_Point_Name
ON -- Control Point Target
    { /* Control Point is evaluated when: */
/* Control Point Targets in a User Environment*/
    DB_OPEN |        /*a database is opened */
    TX_START |       /* transaction start*/
    TX_COMMIT |      /* transaction commit*/
    TX_ROLLBACK |    /*transaction rollback*/
    STMT_OPT |       /* before optimizing next statement*/
    STMT_EXEC |      /* before executing next statement*/
    CONNECT |        /*when a user connects to server*/
/* Control Point Targets in a System Environment*/
    EVENT |          /*when any event occurs*/
    CONDITION |      /*when system intervention occurs*/
    ENQUEUE |        /*entering a ready or run queue*/
    DEQUEUE |        /*leaving a ready or run queue*/
}
    WHEN -- Control Point Filter
    {Boolean Expression}
/*If the expression evaluates to true, then the control point actions are
applied. The expression may be written using SQL (Structured Query
Language) notation and may contain subqueries and stored procedures.*/
    EXECUTE -- Control Point Actions
        {Environment variable assignments, or
        Control statements, or
        Queue manipulations (submit, retract, ... ), or
        Exit controls (e.g., request exit of query), or
        Stored_Procedure_Name, or
        SQL Audit statements, or
        RAISE EVENT Event_Name (e.g. invoke an event subsystem)
        }
```

B. Control Point Target

Control point targets according to the exemplary syntax above define where a control point policy can be attached to an execution path in the database management server 4. That is, targets represent predefined points of server operation where control point policy evaluation is supported. They are grouped into user environment targets and system environment targets. Examples of user and system environment targets are given in the syntax example above.

In the above syntax example, system environment targets are divided into events, conditions and queue-related activities. Events are usually system-defined points of execution that can be referred to within the filter expression associated with a control point policy that is so targeted. Events can also be defined by users in the EXECUTE (action) clause of a control point policy definition. A user-defined event only arises as a result of a control point policy action, following which the event is intercepted by another control point policy that is targeted at the event and whose filter checks for user-defined event types.

Conditions in the above syntax example are similar to user-defined events in that they only occur as a result of control point policy evaluation. In the case of a user-defined event, the evaluation occurs in the context of a defined control point that is crossed as the result of execution of a control point policy action. By contrast, condition-targeted control point policies define system events that should be detected independently of the execution path of a user. Conditions represent invariants for a database management server that need to be evaluated on some regular basis. They are especially useful for identifying when a need for system intervention exists.

Queues in the above syntax example are entities that allow the workload of a database management server to be divided and sequenced according to user needs. They can be used as control point targets in order to define control point policies that are implemented when queue-related activities occur, such as a query request entering or leaving a ready queue or a run queue.

C. Control Point Filter

A control point filter according to the exemplary syntax above can be a Boolean expression (or any other type of evaluation) that determines the conditions under which a control point policy is activated. They allow control points to be context sensitive by providing a mechanism to examine, for example, the query-specific context surrounding a user's query request, to determine if the control point action should occur. Filters are thus control triggers whose effects are based on the operational context at a given control point. For example, a control point filter could evaluate whether a user executing a query is privileged (e.g., a corporate chief executive officer), and if so assign all possible resources to expedite the execution of that query, even if it means terminating all other users on the system temporarily. In this context, the control point filter would effectively control the optimization and execution strategy that is applied to the query request.

Control point filters can be written using a language such as SQL or any other suitable format. If SQL statements are supported, additional support can be provided for the evaluation of stored procedures within filter expressions.

D. Control Point Actions

Control point actions according to the exemplary syntax above are intended to change the context and/or execution path that is used for a given query request. As shown in the syntax description, environmental variables can be set, control statement directives can be issued, requests can be selectively queued or dequeued, query processing can be exited, stored procedures can be invoked, SQL audit statements can be issued, user-defined events can be raised, and so forth. Note that control point actions may also include the application of additional control point policies.

E. Examples of Control Point Policy Definitions

Following are several examples to illustrate the manner in which control point policies can be defined using the exemplary syntax above. Each policy implements one or actions pertaining to commonly-used database query processing parameters upon the occurrence of control point events, and provided specified filter conditions (if present in the policy definition) have occurred.

Example 1

The control point policy of this example is defined to set the isolation level for a user's queries to "repeatable read" when a database is opened (note that there is no filter condition in this example). The repeatable read setting allows the user to read data more than once during a transaction while locking out other users from modifying the data.

```
CREATE CONTROL POINT SetDefaultIsolation
    ON DB_OPEN
    EXECUTE
        set isolation to repeatable read;
```

Example 2

The control point policy of this example is defined to set a query optimizer control statement directive to favor index-joins when a database is opened, and it is an OLTP database. This optimization facilitates OLTP queries that involve relatively few rows of large tables.

```
CREATE CONTROL POINT OLTP_Focus
    ON DB_OPEN
        WHEN Current(dbname) = OLTP_DB
    EXECUTE
    ASSIGN OPTIM_DIRECTIVE FavorIndexes;
```

Example 3

The control point policy of this example is defined to set query optimizer directives to favor DSS-type workloads when a database is opened and it is a DSS database. This is done by setting a control statement directive to favor DSS processing and setting the isolation level to "dirty read" so that data can be read by the user even though it is locked by another user. In addition, if the control point policy definition of this example is applied in a database management system comprising plural database management servers capable of processing queries in parallel, a control statement directive known as PDQPRIORITY (where "PDQ" stands for parallel database query) can be set to request a high degree of parallel processing to facilitate the execution of large DSS queries.

```
CREATE CONTROL POINT DSS_DB
    ON DB_OPEN
        WHEN Current(dbname) = DSS_DB
    EXECUTE
        ASSIGN OPTIM_DIRECTIVE FavorDSS;
        SET ISOLATION TO DIRTY READ;
        SET PDQPRIORITY 20;
```

Example 4

The control point policy of this example is defined so that when a query statement is to be executed and is determined to be a large resource-consuming query, the query is assigned to a given queue that will control the query's access into the database management system. The control point policy definition of this example also contains action commands for logging the query so it can be tracked.

```
CREATE CONTROL POINT ExpensiveQuery
    ON STMT_EXEC
    WHEN Current(QueryCost) > 1,000,000 OR
        Current(QueryNumrows) > 200,000 OR
        Current(QueryThreads) > 40
    EXECUTE
        SUBMIT ExpensiveQueryQueue;
        Insert into logtable (querytext, cost, estrows, user, time)
            VALUES (Current(QueryText), Current(QueryCost),
                Current(QueryNumrows), Current(QueryThreads), USER,
                CURRENT);
```

As the foregoing examples demonstrate, it is relatively easy to define very powerful control point policies using the exemplary syntax above. These control point policies can be defined to apply generally to broad situations involving multiple filter conditions and multiple independent actions, such as Example 4, or they can be defined to apply to a relatively narrow set of situations, such as examples 1, 2 and 3. Additionally, because the definition of a control point policy is independent from its application (see below) it is possible to dynamically add or remove definitions as appropriate in a very simple manner.

III. Control Point Policy Application

As briefly discussed above, control point policies are inactive until applied. When applied, the control point policy becomes active with respect to a specified sphere of database management system operation (the scope), a specified precedence level, and a specified environment. Following is an exemplary syntax that can be used to apply control point policies, including a listing of exemplary parameters that may be selected. Following the syntax definition is a more detailed discussion of each parameter type.

In the database management system of FIG. 1, the control package 18 in a client 10 can be invoked by a user to apply a control policy using the exemplary syntax to be described. The control package 18 would interact with the query management component 16, which in turn would create and store the control policy application in an appropriate storage location (not shown) using the functionality associated with reference numeral 22. In the exemplary syntax description below, terms containing all capital bold letters are command specifications, terms containing initial capital letters and preceded by "--" are parameter type identifiers, and terms within brackets "{ }" are exemplary parameters that could be used in a practical implementation of the invention. It will be appreciated that the exemplary listed command specifications, parameter types and parameters are not intended to be exhaustive, and variants of each could be used in accordance with design preferences. Explanatory comments are identified using standard programming language notation.

A. Apply Control Point

```
APPLY [DBA] [EXCLUSIVE] CONTROL -- Control_Point_Name
AS - Applied_Control_Point_Name    /* creates a named object */
TO - Scope    /*default scope is USER*/
    { DATABASE Database_Name |    /*scope is a database object*/
      SYSTEM   /* three types of system scopes*/
         USER User_Name |
         APPLICATION Application_Name |
         ROLE Role_Name }
AT LEVEL - Level Number    /*used to prioritize different control point
policy applications of overlapping scope*/
WITH [PERSISTENT] [NEW]
      ENVIRONMENT -- Environment_Name
```

B. Scope

In the above syntax example, the scope parameter type permits an applied control point policy to be associated with spheres of control within a database management system. According to the exemplary syntax, these include named databases and three "system" scopes, namely, users, applications and roles. In order to provide a measure of security to database management system operations, a default scope may be assigned so that users can only apply control point policies to themselves. Users may also be permitted to set the scope to a named database. Only users with elevated privileges will normally be permitted to set the scope parameter to applications or roles.

C. Level

The level parameter type in the above syntax is used for purposes of disambiguating the effects of overlapping control points. Smaller level numbers take precedence over larger level numbers (or visa versa). A midpoint default level can be established as a baseline. In many cases, it will be desirable to assign users to the default level. Only a user with elevated privileges will then be allowed to assign a higher or lower level to define actions that should respectively be executed before or after the actions associated with control point policies applied at the default level. Executing control point policy actions before the default level actions handles the case where the actions need to take immediate effect. Executing control point policy actions after the default level actions is appropriate for environment variable settings and other assignments wherein it is desired that the last action have precedence.

A user with elevated privileges will also be allowed to select one of the DBA or EXCLUSIVE keywords in the first line of the APPLY CONTROL statement according to the above syntax. The DBA keyword is used to apply a control point policy with database administrator privileges. The EXCLUSIVE keyword is used to apply a control point policy exclusively so that no other applied control point policy targeted on the same control point will execute.

D. Environment

In the exemplary syntax above, environments insure that control point policy actions can be made consistent with respect to a given defined user or system environment, as opposed to possible inconsistencies that can arise if a control point policy action is dependent on an environment which is unknown at control point policy definition time. By default, the environment specified for the application of a control point policy will only persist for the duration of the control point policy execution. When the control point policy action completes, the original environment is reestablished. This dynamic opening and closing of environments for control point targets ensures that environment settings required to handle a specific control point action statement (or other context specified by a control point filter) can be selectively applied to that statement, and do not linger beyond and affect subsequent statements. According to the above syntax, if a permanent environment change is desired, the application of a new environment can be made within the Action clause of the control point policy definition being applied, or by designating the PERSISTENT keyword in the ENVIRONMENT clause of the APPLY CONTROL statement. The NEW keyword in the exemplary syntax is used to represent a mechanism for creating a new environment that would then be applied throughout the execution of the control point policy action. This is useful to ensure that any current environment does not influence that execution.

E. Examples of Control Point Policy Application

Example 1

In this example, the previously described OLTP_Focus control point policy definition is applied to a named application to provide OLTP optimizations for queries issued pursuant to the application when an OLTP database is opened. Note that there are no level or environment specifications, which means that a default level will be used and the existing environment will remain in effect when the control point policy action is executed. For ease of reference, both the control point policy definition and its application are set forth.

1. Control Point Policy Definition
   CREATE CONTROL POINT OLTP_Focus
   ON DB_OPEN
   WHEN Current(dbname)=OLTP_DB
   EXECUTE
   ASSIGN OPTIM_DIRECTIVE FavorIndexes;

2. Control Point Policy Application
   APPLY CONTROL OLTP_Focus
   AS IndexesForOLTP
   TO APPLICATION oltpapplication

Example 2

In this example, it is assumed that a control point policy has been defined to identify a given database as a DSS database, and controls have been applied to favor star schema optimizations, high PDQPRIORITY, etc. Subsequently, during actual run time, a system administrator may note that the database management system is not performing optimally. The administrator may decide to override existing behavior by directing the database management server's query optimizer to select query plans that favor a higher concurrency level and throughput. Set forth below are exemplary control point policy definition and application statements that may be used to achieve the desired effect.

1. Control point policy definition:
   CREATE CONTROL POINT DSS_OVERRIDE
   ON DB_OPEN
   WHEN Current(NumConcurrent)>100
   EXECUTE
   ASSIGN OPTIM_DIRECTIVE FavorHighConcurrency;
   SET PDQPRIORITY 1;

2. Control point policy application:
   APPLY CONTROL DSS_OVERRIDE
   AS LIGHTEN_DB 1_MEM
   TO DATABASE db1
   AT LEVEL 1;

In this example, once the number of concurrent connections to the database db1 exceeds 100, all future connections are directed to favor indexes, which tend to reduce memory requirements. Note that the control point policy definition is relatively generic. It is the control point policy application that specifies the more detailed context, which is the database name. The specification of a high-priority level number insures that this directive will override any control points that may also be applied at DB_OPEN for database db1. As described above, if the system administrator wanted to make this control point policy the only control that is applied, he/she could use the EXCLUSIVE keyword in the APPLY CONTROL statement.

Example 3

This example demonstrates the application of a control point policy with a non-default privilege level using the previously described DSS_DB control point policy definition. No scope or environment are specified in the APPLY CONTROL statement. Thus, a default user scope may be used and the environment will not change. Note that the user who invokes the APPLY CONTROL statement will need to be assigned a privilege level that allows the level number specified in the APPLY CONTROL statement to be set. For ease of reference, both the control policy definition and its application are set forth.

1. Control Point Policy Definition
   CREATE CONTROL POINT DSS_DB
   ON DB_OPEN
   WHEN Current(dbname)=DSS_DB
   EXECUTE
       ASSIGN OPTIM_DIRECTIVE FavorDSS;
       SET ISOLATION TO DIRTY READ;
       SET PDQPRIORITY 20;

2. Control Point Policy Application
   APPLY DSS_DB
   AS GIVEME_DSS
   AT LEVEL 5;

IV. Control Point Evaluation

A control point target represents any predetermined place (or time) in a database management server where a control point policy can be attached. In the database management system 2 of FIG. 1, the query management component 16 performs a control point evaluation whenever the execution path of a server thread crosses such a target. Set forth below is an exemplary sequence of steps that the query management component 16 can undertake to determine which control point policy applications are to be executed and in what order. These steps are shown in the flow diagram of FIG. 2. The functionality identified by reference numeral 24 of FIG. 1 provides this processing logic.

In a first step 30 of FIG. 2, the query management component 16 determines via monitoring of the database management server functions 14 that a defined control point has been reached. In step 32, the query management component 16 evaluates the filter conditions of all applied control point policies that target this control point to determine which policies are candidates for execution. In step 34, the candidate control point policies are ordered in terms of the associated level number. It will be recalled from the discussion above that every applied control point policy will have a level number that was either explicitly specified during the APPLY CONTROL statement or was implicitly assigned by default. In step 36, the ordered control point policy candidates are searched for policies that were defined as exclusive by way of the EXCLUSIVE keyword in the APPLY CONTROL statement. In step 38, if there are any exclusive control point policies, the one with the highest level is exclusively executed in step 40. Otherwise, each of the candidate control point policies is executed in order of their respective levels.

A. Examples of Control Point Evaluation

Example 1

This example uses the control point policy definitions of examples 2 and 3 of the previous section on control point policy definition. The example also uses the control point policy applications of examples 2 and 3 of the previous section on control point policy application. For ease of reference, these policy control point definitions are repeated, as follows:

1. Control Point Policy Definitions a. First Definition
CREATE CONTROL POINT DSS_DB
ON DB_OPEN
WHEN Current(dbname) = DSS_DB
EXECUTE
    ASSIGN OPTIM_DIRECTIVE FavorDSS;
    SET ISOLATION TO DIRTY READ;
    SET PDQPRIORITY 20;
b. Second Definition
CREATE CONTROL POINT DSS_OVERRIDE
ON DB_OPEN
WHEN Current(NumConcurrent) > 100
EXECUTE
    ASSIGN OPTIM_DIRECTIVE FavorHighConcurrency;
    SET PDQPRIORITY 1;

2. Control Point Policy Application a. First Control Point Policy Application
APPLY DSS_DB
AS GIVEME_DSS
AT LEVEL 5;
b. Second Control Point Policy Application
APPLY CONTROL DSS_OVERRIDE
AS LIGHTEN_DB 1_MEM
TO DATABASE DSS_DB
AT LEVEL 1;

Based on the control point targets contained in the control point policy definitions, the control point policy evaluation logic 24 in the query management component 16 would first execute GIVEME_DSS for users opening the DSS_DB database. If the number of concurrent queries becomes excessive, OVERRIDE_DSS would be executed for all users who have opened DSS_DB. The order of execution actions would be as follows:
ASSIGN OPTIM_DIRECTIVE FavorDSS;
SET PDQPRIORITY 20;
SET ISOLATION TO DIRTY READ;
ASSIGN OPTIM_DIRECTIVE FavorIndexes;
SET PDQPRIORITY 1;

Note that if the EXCLUSIVE keyword had been applied to either control point policy application, only one of the action sets would have been executed; namely, the one defined with the EXCLUSIVE keyword. If the EXCLUSIVE keyword had been used on both application definitions, only the OVERRIDE_DSS control point policy application would apply because it has the higher priority level number and the GIVEME_DSS control point policy application would be ignored.

V. Control Point Policy Tracing

It may be desirable to retain a trace of a footprint of the definition, application and evaluation of control point policies. The policy tracing functionality 26 of FIG. 1 can be used for this purpose. Policy tracing can be invoked by way of a client control package 18 issuing a control point tracing request statement to the query policy management component 16. The exemplary syntax set forth below may be used for this purpose. In this example, the NAME clause identifies one or more control point policies, the SCOPE clause identifies particular spheres of interest, and the EFFECT clause specifies whether to trace only control point policies that have been evaluated, control point policies that have been applied, or all control point policies.

```
TRACE CONTROL POINT --    /*ALL is default for TRACE clauses*/
    [NAME {Control_Point Name, ALL}]
    [SCOPE {SYSTEM, DATABASE, USER, ROLE, ALL}]
    [EFFECT {EVALUATED, APPLIED, ALL}];
```

In response to a statement such as the foregoing, the policy tracing functionality 26 will create a log of the specified control point policies.

VI. Control Database

The control point policy database 28 of FIG. 1 contains a consolidated view of all control point policy definitions and applications. These can be monitored by external applications, and can be changed dynamically using conventional database management utilities. Various tables may be used in the database 28, including tables of control point policy definitions and applications, environment definitions and applications, queue definitions and applications, etc.

VII. Conclusion

It will be appreciated that there are a number of benefits and advantages to be derived from the present invention. For example, a user can define how the contradictory goals and demands of workloads containing a wide diversity of queries, transactions, number of users and types of activities are to be balanced within a single database management server. The control point policies disclosed herein allow the definition of specific goals, specified in terms of control actions applied at points of natural workload context (e.g., the opening of a database) identified by the control point and the control point filter, and the appropriate scoping of these attributes so that policies can be applied either at the level of individual users and aggregated groups of users (e.g., applications and roles). By using levels and privileges, a hierarchy of control point policies can be applied to disambiguate the potentially overlapping scopes of user roles, databases and per-user settings.

Accordingly, a query management technique for a database management system has been disclosed. It will be appreciated that the inventive concepts may be variously embodied in any of a data processing system, a machine implemented method, and a computer program product in which programming means are recorded on one or more data storage media for use in controlling a data processing system to perform the required functions. While several embodiments of the invention have been shown and described, it should be apparent that many variations and alternative embodiments could be implemented. It is understood, therefore, that the invention is not to be in any way limited except in accordance with the spirit of the appended claims and their equivalents.

What is claimed is:

1. A method for managing database query execution by way of flexible policies that are defined and applied to operate at specified operational control points in a database management system, comprising:
    providing an automated user interface for said database management system;
    receiving a control point policy at said interface, said control point policy specifying:
        a control point policy name;
        a control point target representing a database management execution path location where said control point policy is attached;
        a control point policy filter specifying an operational context at said control point policy target that causes a database query management action to be performed; and
        a database query management action that is performed in response to said control point policy target being reached during operation of said database management system and said filter evaluating to true;
    creating a control point policy definition of said control point policy, said control point policy definition being inactive but capable of instantiation in multiple instances by applying said control policy definition to multiple spheres of database operation, including spheres that are overlapping;
    receiving a control point policy activation request at said interface, said control point policy activation request specifying:
        a control point policy name;
        a control point policy application name;
        a sphere of database operation to which said control point policy is applied;
        a level at which said control point policy is applied relative to other control point policies applied to overlapping spheres; and
        an environment in which said control point policy is executed; and
    activating said control point policy in response to said control point policy activation request by applying an instance of said control point policy definition to said sphere of database operation at said level and with said environment.

2. The method in accordance with claim 1 wherein said control point policy specifies a control point target that represents a database operational condition that causes evaluation of said control point policy.

3. The method in accordance with claim 1 wherein said control point policy specifies a control point policy filter that determines whether said control point policy is implemented.

4. The method in accordance with claim 1 wherein said control point policy specifies a control point policy action that is implemented as said database query management action pursuant to a control point policy.

5. The method in accordance with claim 1 wherein said applying includes applying said control point policy definition instance at a level that is specifiable via said interface and represents the precedence of said control point policy relative to other control point policies for spheres of database operation that overlap.

6. The method in accordance with claim 1 wherein said applying includes applying said control point policy definition instance with an environment for control point policy execution that is specifiable via said interface and represents a run-time environment that will exist while said control point policy definition instance is active.

7. The method in accordance with claim 1 further including evaluating said control point policy, said evaluating including evaluating an applied control point policy filter in response to a control point being reached to determine whether said control point policy action is taken.

8. The method in accordance with claim 1 further including retaining a history of applied control point policy evaluations.

9. The method in accordance with claim 1 further including maintaining a database of control point policies.

10. The method in accordance with claim 2 wherein said control point target is specifiable via said interface from a group that includes user environment control point targets and system environment control point targets.

11. The method in accordance with claim 10 wherein said user environment control point targets are specifiable via said interface from a group that includes (1) database open, (2) transaction start, (3) transaction commit, (4) transaction rollback, (5) before statement optimization, and (6) before statement execution.

12. The method in accordance with claim 10 wherein said system environment control point targets are specifiable via said interface from a group that includes events, conditions and queue-related activities.

13. The method in accordance with claim 11 wherein said system environment control point targets that are events include (1) any system events and (2) events defined as part of control point policy database query management actions.

14. The method in accordance with claim 11 wherein said system environment control point targets that are conditions include system events requiring intervention that are detected independently of user execution paths.

15. The method in accordance with claim 11 wherein said system environment control point targets that are queues include (1) when entering a ready queue or a run queue and (2) when exiting a ready queue or a run queue.

16. The method in accordance with claim 1 wherein said applying includes applying said control point policy definition instance to an application representing said sphere of database operation, said application being specifiable via said interface and representing an ability of one or more users to communicate and control said database management system by explicitly defining distinct partitions of a complex workload.

17. The method in accordance with claim 1 wherein said applying includes applying said control point policy definition instance to a role representing said sphere of database operation, said role being specifiable via said interface and representing a user-defined collection of privileges that allows database control parameters to be managed on a group basis.

18. The method in accordance with claim 1 wherein said control point target in said control point policy is selected from:
a group of user control point arguments that include (1) database open, (2) transaction start, (3) transaction commit, (4) transaction rollback, (5) before optimizing next statement, (6) before executing next statement, and (7) when a user connects to a database management server; and
a group of system control point arguments that include (8) when any event occurs, (9) when system intervention occurs, (10) when entering a ready queue or a run queue, and (11) when leaving a ready queue or a run queue.

19. The method in accordance with claim 1 wherein said sphere of database operation in said control point policy application is selected from:
a user scope that includes (1) a database name; and
a system scope that includes (2) a user name, (3) an application representing an ability of one or more users to communicate and control said database management system by explicitly defining distinct partitions of a complex workload, and a role representing a user-defined collection of privileges that allows database control parameters to be managed on a group basis.

* * * * *